United States Patent [19]

Yamada et al.

[11] Patent Number: 4,766,950
[45] Date of Patent: Aug. 30, 1988

[54] CONTROLLER FOR AN AIR CONDITIONER OF VEHICLES

[75] Inventors: Kiichi Yamada; Akio Senoo, both of Okazaki; Jun Iimura, Aichi; Ryosaku Akimoto, Aichi; Nakaji Kawauchi, Aichi, all of Japan

[73] Assignee: Mitsubishi Jukogyo Kabushiki Kaisha, Japan

[21] Appl. No.: 615,958

[22] Filed: May 31, 1984

[51] Int. Cl.[4] .............................................. F25B 29/00
[52] U.S. Cl. ........................................ 165/17; 62/226; 165/30; 165/43
[58] Field of Search ................ 62/229, 226; 165/28, 165/17, 30, 42, 43

[56] References Cited

U.S. PATENT DOCUMENTS

| | | | |
|---|---|---|---|
| 4,337,818 | 7/1982 | Franz | 165/43 X |
| 4,340,113 | 7/1982 | Iwata et al. | 165/43 X |
| 4,358,936 | 11/1982 | Ito et al. | 165/43 X |
| 4,365,663 | 12/1982 | Inoue et al. | 165/43 X |
| 4,383,574 | 5/1983 | Yoshioka | 165/43 |
| 4,416,324 | 11/1983 | Sutoh et al. | 165/43 X |
| 4,466,480 | 8/1984 | Ito et al. | 165/30 X |
| 4,476,919 | 10/1984 | Akimoto et al. | 165/30 X |
| 4,540,040 | 9/1985 | Fukumoto et al. | 165/30 X |

Primary Examiner—William R. Cline
Assistant Examiner—Randolph A. Smith
Attorney, Agent, or Firm—McGlew and Tuttle

[57] ABSTRACT

In an air conditioner of vehicles including a fan for sending air, a cooling unit for cooling air sent by the fan, a heater for heating air sent by the fan, an air mix damper for adjusting the amount of air passing through the heater and cooled by the cooling unit, and a control unit for controlling an opening of the air mix damper in response to a cooling and heating load, a controller for an air conditioner of vehicles has a dehumidifying operation mode in which the opening of the air mix damper is adjusted to effect the air conditioning operation and an energy saving operation mode in which the duty ratio of turning on and off a compressor is changed to effect the air conditioning operation, and comprises a fan drive control unit for increasing the amount of wind in a region where the cooling and heating load is large.

1 Claim, 8 Drawing Sheets

——— : WITH SHORT CIRCUIT
- - - - : WITHOUT SHORT CIRCUIT

CONTROLLER FOR AN AIR CONDITIONER OF VEHICLES

FIELD OF THE INVENTION

The present invention relates to a controller for an air conditioner of vehicles, and more particularly to a controller saving the energy of an automatic air conditioner.

BACKGROUND OF THE INVENTION

Recently, many vehicles are provided with an automatic air conditioning system which automatically controls an air conditioner of vehicles.

FIG. 1 shows a construction of such an automatic air conditioning system. In the system, the air conditioning operation is so effected that air sucked by a fan 10 is cooled by an evaporator 1 and then a heater 2 through which hot water flows heats air which is blown out into a compartment of a vehicle by fan. The temperature of the blow out air is controlled by an opening of an air mix damper 3. The damper is controlled by a control unit 4 on the basis of a setting value of a temperature, a temperature in the compartment, a temperature of a duct and the quantity of solar radiation. The setting value of the temperature is set by a temperature setting resistance 5. The temperature in the compartment is sensed by a temperature sensor 6. The quantity of solar radiation is detected by a solar radiation sensor 7.

FIGS. 2(A) to 2(D) show a voltage for driving the fan, an opening of the air mix damper, a temperature of the blow out air into the compartment and a state of a hot water valve for the heater with regard to a load in the cooling and heating mode in a conventional automatic air conditioning system, respectively.

In a curve of the temperature of the blow out air into the compartment shown in FIG. 2(C), a line a shows a temperature of air sent out of the evaporator 1. An arrow b shows a reheated temperature (a difference between the temperature of the blow out air into the compartment and the temperature of the air sent out of the evaporator 1). An arrow c shows a region in which a compressor 9 for cooling is not used (in the case of the heating operation), and an arrow d shows a region in which an energy loss is produced (a reheating region after cooling).

As apparent from FIG. 2(C), the air conditioning operation of the conventional automatic air conditioning system is made by maintaining the blow out air temperature from the evaporator 1 constant in the cooling operation and then adjusting the air mix damper 3 (i.e. by adjusting the mixture ratio of cool air and hot air passing through the heater 2). Thus, in view of saving energy, which has become important due to the high price of gasoline, the conventional automatic air conditioning system in which air cooled by the evaporator 1 is reheated by the heater 2 to perform the air conditioning operation is operated to oppose the energy savings.

Further, a controller for the conventional automatic air conditioning system has been so constructed that a fan change-over switch 8 and a damper actuator for controlling the cooling and heating operation are directly connected to each other. Therefore, since the compressor 9 must be always operated even in spring or autumn that the cooling load is less, it is difficult to effectively attain an energy saving operation.

Furthermore, even if a vehicle is provided with the above automatic air conditioning system, a cooling operation is niot often made in a cold area, for example, a north district. However, a manual operation of controlling the opening of the air mix damper and a fan driving voltage lacks commercial attraction. Accordingly, a controller for automatically controlling a temperature only in the heating mode has been desirable.

SUMMARY OF THE INVENTION

Accordingly, it is an object of the present invention to provide a controller for an air conditioner of vehicles which suppresses useless operations and can attain an energy saving operation.

It is another object of the present invention to provide a controller for an air conditioner of vehicles capable of controlling a temperature automatically only in the heating mode.

It is still another object of the present invention to provide a controller for an air conditioner of vehicles which can be easily converted from a system capable of controlling a temperature automatically only in the heating mode to an automatic air conditioning system capable of controlling a temperature automatically in the cooling and heating mode.

BRIEF DESCRIPTION OF THE DRAWINGS

The present invention will be described on the basis of embodiments shown in the drawings, in which.

DESCRIPTION OF THE PREFERRED EMBODIMENTS

Figure 1:
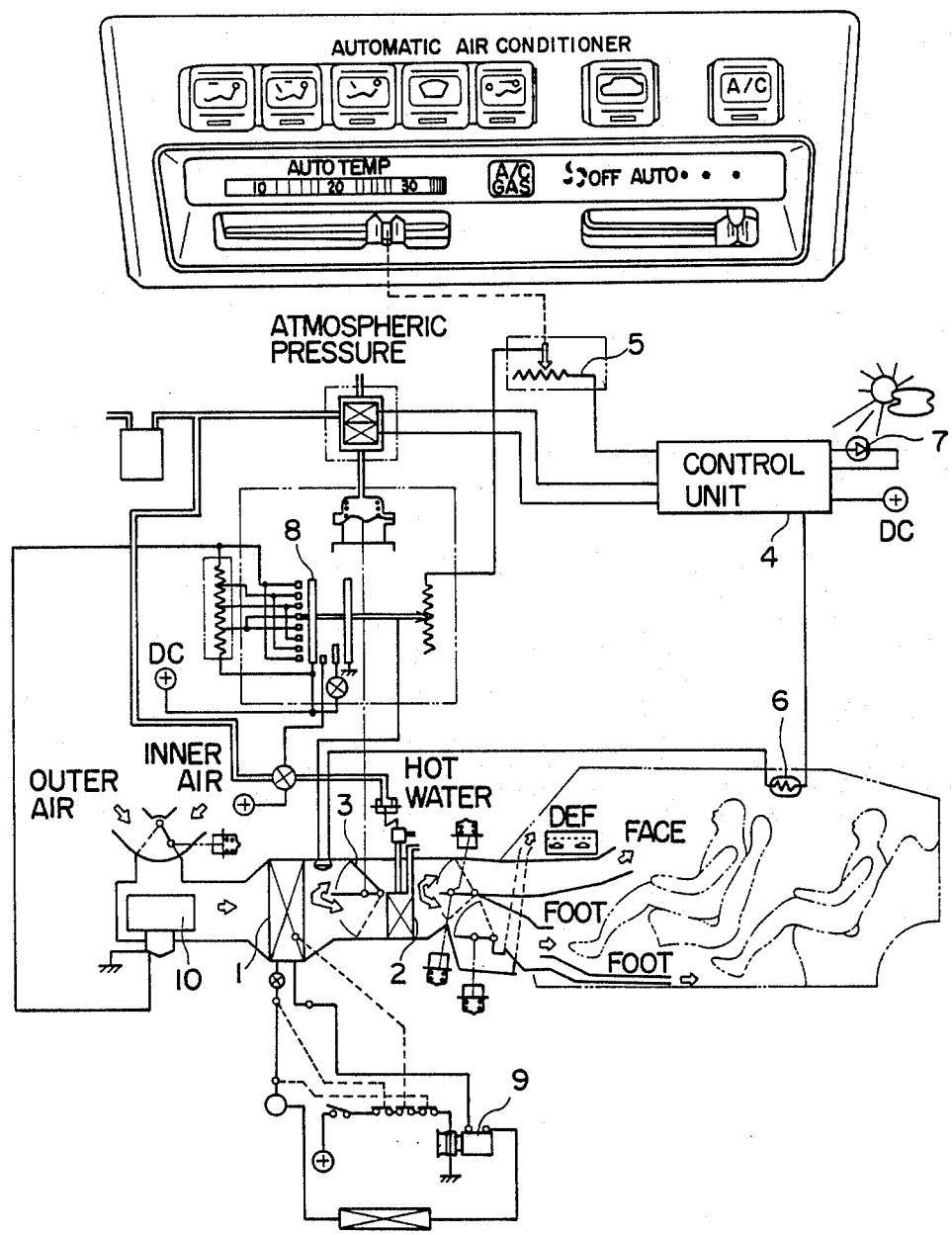
FIG. 1 shows a system diagram of a prior art air conditioner.
Figure 2A:
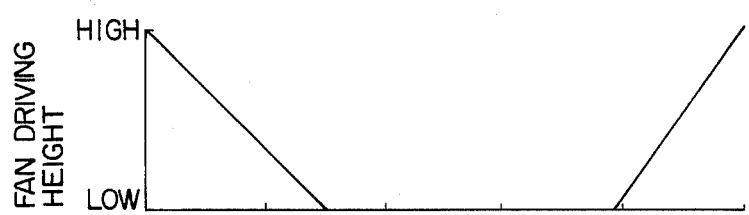
FIGS. 2(A) to 2(D) show a fan driving voltage, an air mix damper opening, a blow out air temperature into a compartment and a state of a hot water valve for a heater in the prior art automatic air conditioning system, respectively.
Figure 2B:
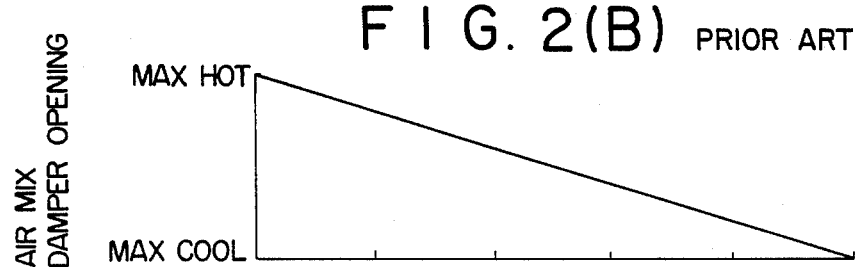
Figure 2C:
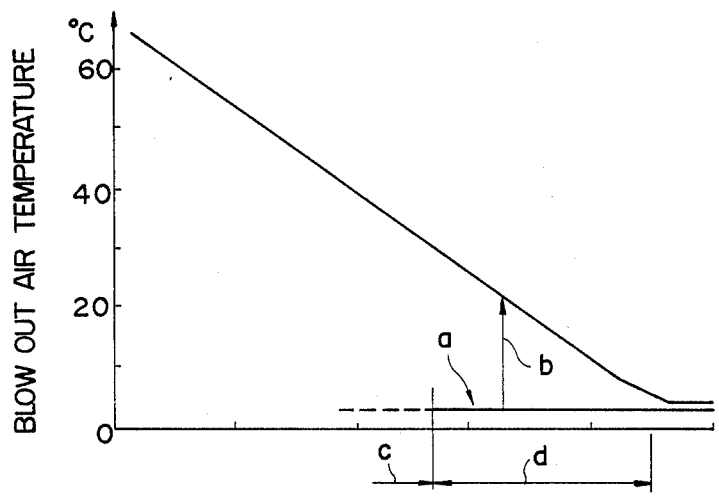
Figure 2D:
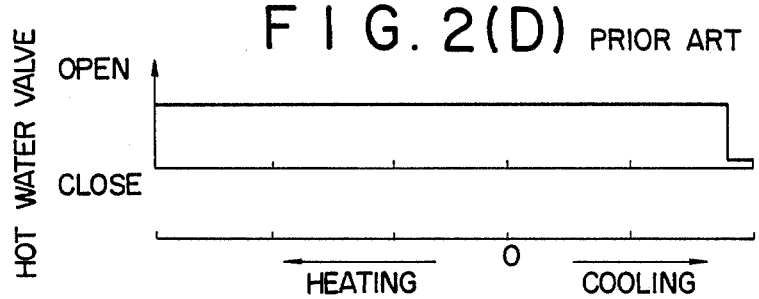
Figure 3:
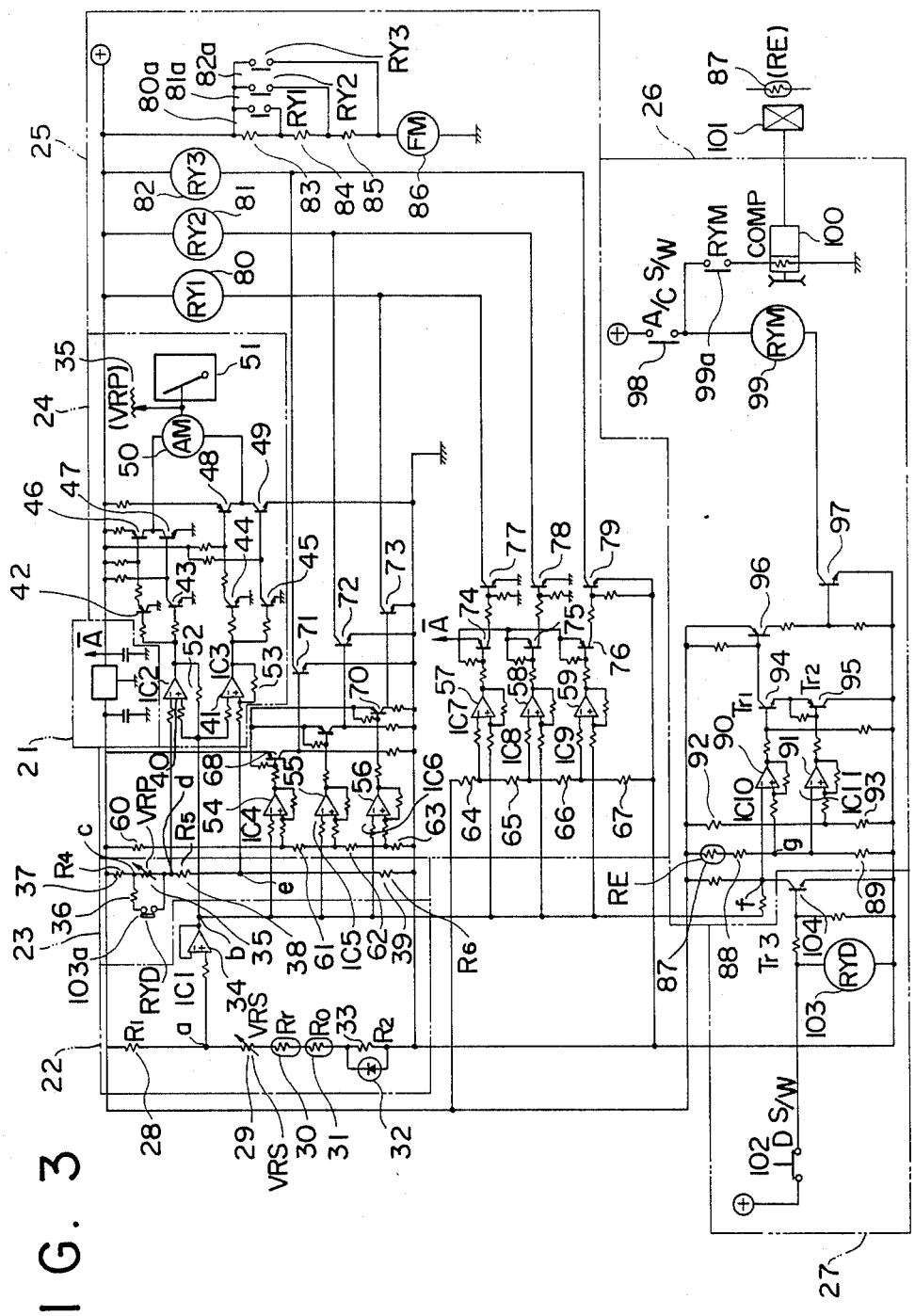
FIG. 3 shows an electrical circuit diagram of a controller according to one embodiment of the present invention.

Referring to FIG. 3, an electrical circuit of a controller according to the present invention comprises a constant voltage generating circuit 21, a circuit 22 for generating a command value, a circuit 23 for producing an amount of feedback of an air mix damper opening, an actuator control circuit 24 for the air mix damper, a fan control circuit 25, a control circuit 26 for turning on and off a compressor, and a dehumidification control circuit 27.

The command value generator 22 includes a fixed resistor (R1) 28, a variable resistor (VRS) 29 for setting a temperature, a sensor (Rr) 30 for detecting a temperature in a compartment of a vehicle and a sensor (Ro) 31 for detecting a temperature outside of the vehicle, connected in series to each other, and a sensor (SS) 32 for detecting an amount of solar radiation and a fixed resistor (R2) 33 connected in parallel with each other. A voltage at a point a in the circuit is given by an equation (1) where A, B, C, D and E are predetermined constants.

$$V = A - B \cdot VRS + C \cdot Rr + D \cdot Ro + E \cdot SS \quad (1)$$

The potential signal at the point a is impedance-converted by a buffer (IC1) 34 and appears at a point b with the same potential as at the point a, said potential is called as "the command value" hereinafter.

The circuit 23 for producing the amount of feedback of the air mix damper opening includes a series connection of a potentiometer (VRP) 35 operated in interlocked relationship with the operation of an air mix damper 51 and fixed resistors (R4) 37, (R5) 38 and (R6) 39, and a fixed resistor (R8) 36 connected in parallel with the potentiometer (VRP) 35 through a contact 103a of a dry relay (RYD) 103 described later. The contact 103a of the dry relay is on in the energy saving operation and off (to short out resistor 36) in the dehumidifying operation.

The resistance Rcd·D between the points c–d in the dehumidifying operation is given by:

$$Rcd \cdot D = VRP \quad (2)$$

The resistance Rcd·E between the points c–d in the energy saving operation is given by:

$$Rcd \cdot E = \frac{VRP \times R3}{VRP + R3} \quad (3)$$

The combined resistance between the points c–d is dependent on the VRP and R3, i.e. the opening of the air mix damper 51 and the ON-OFF condition of the dry relay contact. The relation between the opening of the air mix damper and the combined resistance between the points c–d is shown in FIG. 5.

Figure 4A:
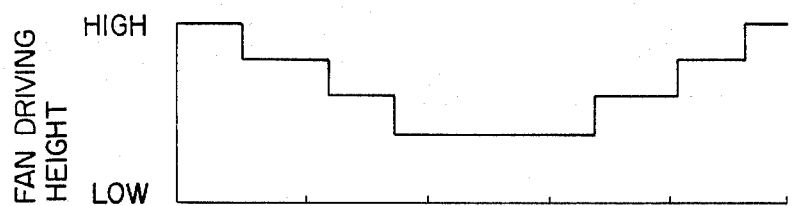
FIGS. 4(A) to 4(C) show a fan driving voltage characteristic, an air mix damper opening characteristic and a blow out air temperature characteristic with regard to command values in the controller of FIG. 3, respectively.
Figure 4D:
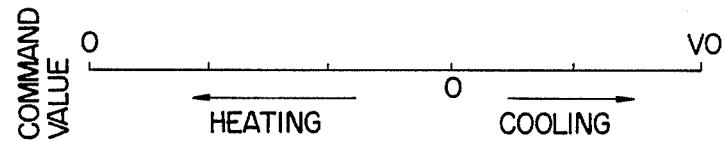
FIG. 4(D) shows the command values which are common variables of the characteristics of FIGS. 4(A) to 4(C).
Figure 5:
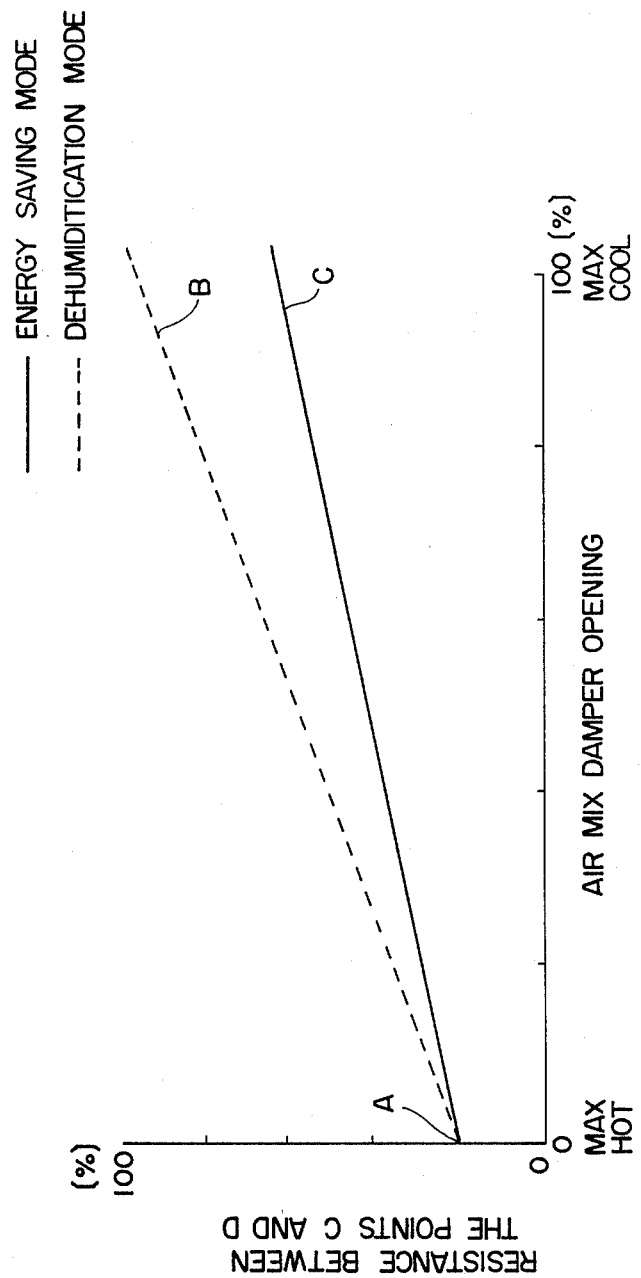
FIG. 5 shows a relation between the air mix damper opening and a resistance between points c and d.

The value of the fixed resistor (R3) 36 is determined so that the resistance or the combined resistance shown at a point A in FIG. 5 (the air mix damper opening is 0%) i.e. at the side of MAXHOT is almost identical in the dehumidifying operation and the energy saving operation and the combined resistance at a point C (the relay 103 is on and the air mix damper opening is 100%) is equal to about 60% of the resistance shown at a point B (the air mix damper opening is 100%) in the dehumidifying operation. The resistance characteristic of the potentiometer (VRP) 35 and the resistance values of the fixed resistors (R4) 37, (R5) 38 and (R6) 39 are determined so that the potential at the point a or b given by the equation (1) and variable in the predetermined control range shown in FIG. 4(D) i.e., the command value is substantially equal to the potential at the point d variable depending on the resistance of the potentiometer (VRP) 35 which is varied within the predetermined feedback range and a proper air conditioning operation is obtained.

The actuator control circuit 24 for the air mix damper includes comparators (IC2) 40 and (IC3) 41, transistors 42 to 49, a motor 50 for actuating the air mix damper, the air mix damper 51 and the potentiometer (VRP) 35 for feedback. The circuit 24 controls the opening of the air mix damper on the basis of the potential difference between the points b and d or the points b and e. At this time, the resistance of the potentiometer (VRP) 35 is changed in interlocked relationship with this operation so that the potential difference between the points b and d or the points b and e is minimized. Consequently, in the case of the dehumidifying operation (the contact 103a of the dry relay 103 is open), the relation between the command value and the opening of the air mix damper is as shown by a dotted line in FIG. 4(B), while in the case of the energy saving operation (the fixed resistor (R3) 36 is connected in parallel with the potentiometer (VRP) 35), the potential at the points d and e is increased and the comparator (IC3) 41 is turned on while the comparator (IC2) 40 is turned off so that the air mix damper 51 and the potentiometer (VRP) 35 are operated to move to the COOL side as shown in FIG. 4(B) and to stop its movement when the potential at the points d and e approaches the potential at the point b.

Figure 4B:
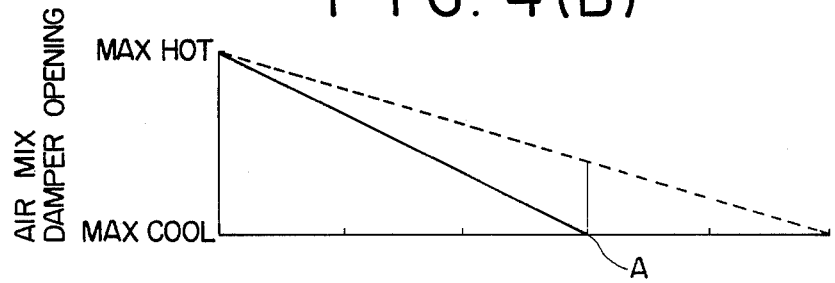

As described above, the resistance value of the fixed resistor (R3) 36 is determined so that the amount of movement of the air mix damper to the COOL side corresponding to the command value due to the parallel connection of the fixed resistor (R3) 36 is equal to a value near the point A of FIG. 4(B). The fixed resistor (R5) 38 serves to form an insensible zone in which both the comparators (IC2) 40 and (IC3) 41 are off and the fixed resistors 52 and 53 serve to cause the comparators 40 and 41 to have a hysteresis characteristic so that these resistors are determined to attain the comfortable air conditioning operation.

The fan control circuit 25 includes comparators (IC4) 54, (IC5) 55 and (IC6) 56 each having a non-inverting input terminal to which the command value is applied and an inverting input terminal to which a voltage divided by fixed resistors 60, 61, 62 and 63 is applied, comparators (IC7) 57, (IC8) 58 and (IC9) 59 each having an inverting input terminal to which the command value is applied and a non-inverting input terminal to which a voltage divided by fixed resistors 64, 65, 66 and 67, transistors 68 to 73 and 74 to 79 connected to the outputs of the comparators, respectively, power relays (RY1) 80, (RY2) 81 and (RY3) 82 which are controlled through the transistors by the outputs of the comparators, and fixed resistors 83 to 85 arranged in series to the fan and shorted by contacts 80a, 81a and 82a of the power relays, respectively. The amount of airflow or wind is increased or decreased in stages by changing the voltage applied to the fan motor 86 by means of the power relay. The comparators 54, 55 and 56 serve to switch the heating region while the comparator 57, 58 and 59 serve to switch the cooling region. The resistance values of the fixed resistors 60 to 63 and 64 to 67 are determined in view of the air conditioning operation so that the characteristic as shown in FIG. 4(A) is attained.

The control circuit 26 for turning on and off the compressor includes a temperature sensor (RE) 87 for the blow out air from the evaporator, fixed resistors 88 and 89 arranged in series to the sensor, a comparator (IC10) 90 having a non-inverting input terminal to which the potential at the point g between the fixed resistors (the potential corresponding to the temperature of the blow out air from the evaporator) is applied and an inverting input terminal to which the command value is applied, fixed resistors 92 and 93, a comparator (IC11) 91 having an inverting input terminal to which the potential at the point g is applied and a non-inverting to which a voltage divided by the fixed resistors 92 and 93, transistors 94 and 95 forming an AND circuit having two inputs to which the outputs of the comparators (IC10) 90 and (IC11) 91 are applied, and transistors 96 and 97, a power relay (RYM) 99 and a switch (A/C S/W) 98 for turning on and off the compressor (COMP) 100 in response to the output of the AND circuit.

In the circuit, the potential at the point g for turning on and off the comparator 90 in response to the magnitude of the potential corresponding to the command value is changed.

Figure 4C:
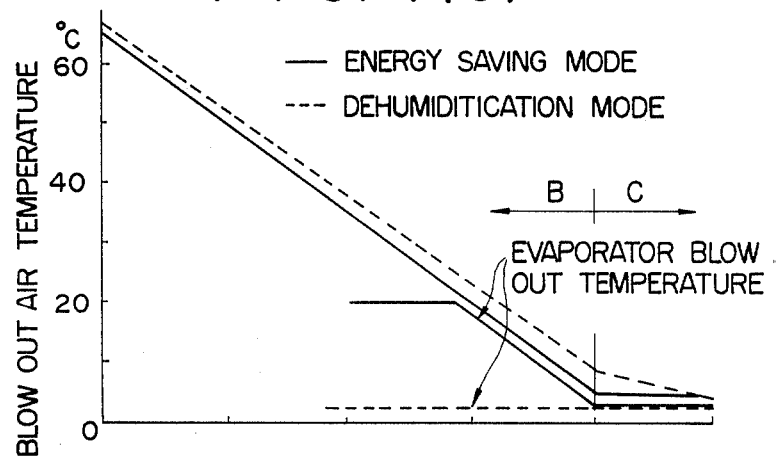

The relation between the command value and the blow out air temperature of the evaporator in the case where the transistor (TR1) 94 is on is shown in the region B of the energy saving operation in FIG. 4(C) (see left pointing arrow). The relation between the command value and the blow out air temperature in the case where the transistor (TR2) 95 is on is shown in the region C of the dehumidifying operation and the energy saving operation in FIG. 4(C) (see right pointing arrow). The transistors 94 and 95 form the AND circuit and control the cycling of the compressor (COMP) 100 through the transistors 96 and 97, the power relay (RYM) 99 and the contact 99a thereof when the switch (A/C S/W) 98 is on. At this time, the temperature sensor 87 disposed at the exit of the evaporator 101 detects the temperature of the blow out air and controls via turning on and off the compressor so that the potential at the point g is equal to the potential at the point f on the average.

The average temperature detected by the sensor 87 and formed by turning on and off the comparator 91 corresponds to the temperature for preventing the evaporator from freezing.

In the case of the energy saving operation, since the air mix damper 51 is completely closed (MAXCOOL) in the cooling region as shown in FIG. 4(B), the air conditioning operation is effected by making the blow out air temperature corresponding to the command value, and the fixed resistors 88 and 89 are properly determined so that the above relation is achieved.

The dehumidification control circuit 27 includes a dry switch (DS/W) 102, a dry relay (RYD) 103 and a transistor (TR3) 104. When the dry switch (DS/W) is turned on in order to perform the dehumidifying operation, the dry relay (RYD) 103 is excited and the relay contact 103a thereof is turned off. The parallel connection of the fixed resistor (R3) 36 to the potentiometer (VRP) 35 is released. At the same time, the transistor (TR3) 104 is turned off and the point f is connected to the ground. The comparator 90 always becomes on by the connection of the point f to the ground and the compressor 100 is controlled to be turned on and off only by the comparator 91. In other words, the temperature of the blow out air from the evaporator is not changed on the basis of the command value as in the energy saving operation and the freezing of the evaporator 101 is merely prevented.

The operation of the circuit is now described.

A desired temperature in the compartment of the vehicle is set by the variable resistor 29. The potential at the point a or the point b is calculated by the equation (1) on the basis of the temperatures and the amount of solar radiation detected by the sensor 30 for detecting the temperature in the compartment of the vehicle, the sensor 31 for detecting the temperature outside of the vehicle and the sensor 32 for detecting the amount of solar radiation, respectively, and is given as a command value. The command value V varies in the range of 0—Vo as shown in FIG. 4(D), and the heating capability is maximum when V=0 while the cooling capability is maximum when V=Vo. The fan driving voltage as shown in FIG. 4(A) is applied to the fan motor 86 through the control circuit 25 as described above. The fan motor 86 is so driven that the amount of airflow or wind is increased in stages in the range where the large heating and cooling capability is required.

Further, the command value is supplied to the control circuit 24 for actuating the air mix damper. The air mix damper 51 is driven as described above, and the opening of the air mix damper 51 is controlled in the cooling operation or the heating operation as shown in FIG. 4(B).

In the case of the energy saving operation in which the dry switch 102 is off, the opening of the air mix damper 51 is set to the MAXCOOL position with the command value V of about 0.6×Vo as described above.

The command value is further supplied to the control circuit 26, and the compressor is controlled to be turned on and off when the switch 98 is on. In the energy saving operation where the dry switch 102 is off, the compressor is repeatedly turned on and off so that the potential at the point g is equal to the potential at the point f as described above. In the cooling region, since the air mix damper 51 is completely closed as shown in FIG. 4(B), the evaporator blow out temperature becomes a temperature corresponding to the command value by the operation of turning on and off the compressor 100 as shown in FIG. 4(C) to attain the air conditioning operation.

On the other hand, in the dehumidifying operation in which the dry switch 102 is on, the evaporator blow out temperature is not changed on the basis of the command value as in the energy saving operation and the compressor is operated in the same manner as in the conventional system while preventing the freezing of the evaporator by means of the operation of the comparator 91. The evaporator blow out temperature is maintained constant and the opening of the air mix damper is controlled to attain the air conditioning operation.

As described above, the operation can be changed to the energy saving operation or the dehumidifying operation and the air conditioning operation in the energy saving mode does not use the air mix damper rather it is done by turning on and off the compressor to control the evaporator blow out temperature. Hence, the useless operation of the compressor can be suppressed and the energy saving operation can be attained. In the region where the large cooling and heating capability is required, since the amount of airflow or wind produced by the fan is increased in stages, a comfortable air conditioning operation corresponding to the load can be attained.

Figure 6:
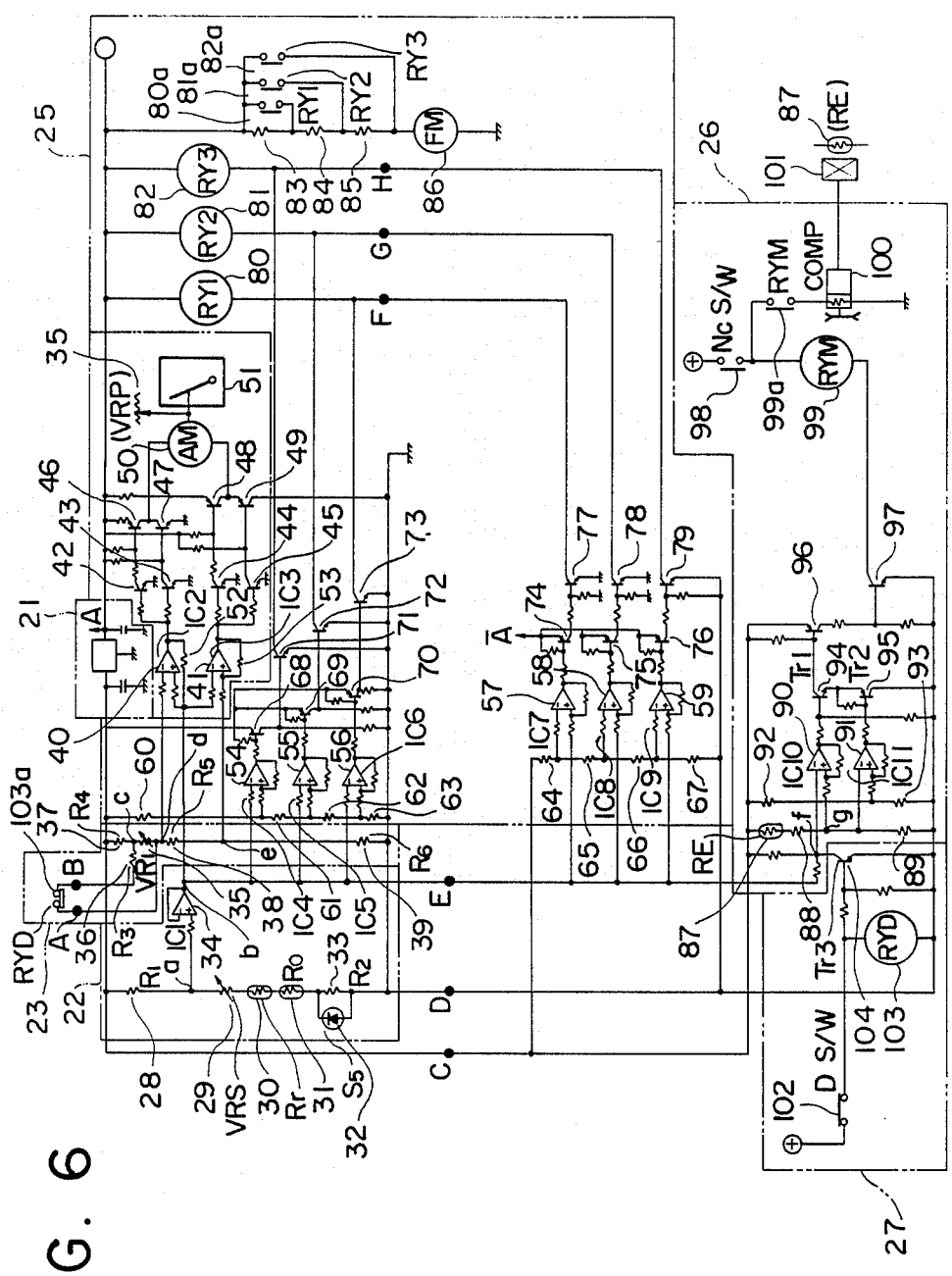
FIG. 6 shows an electrical circuit diagram of a controller according to another embodiment of the present invention.

FIG. 6 shows the same system as in FIG. 3 with the exception that the system can be divided into two portions at points A, B, C, D, E, F, G and H with black round marks. The portion above the points A and B and under the points C, D, E, F, G and H in FIG. 6 is named an air conditioning system and the other portion is named an automatic heater system. Both the systems are combined to form the automatic air conditioning system.

Figure 7:
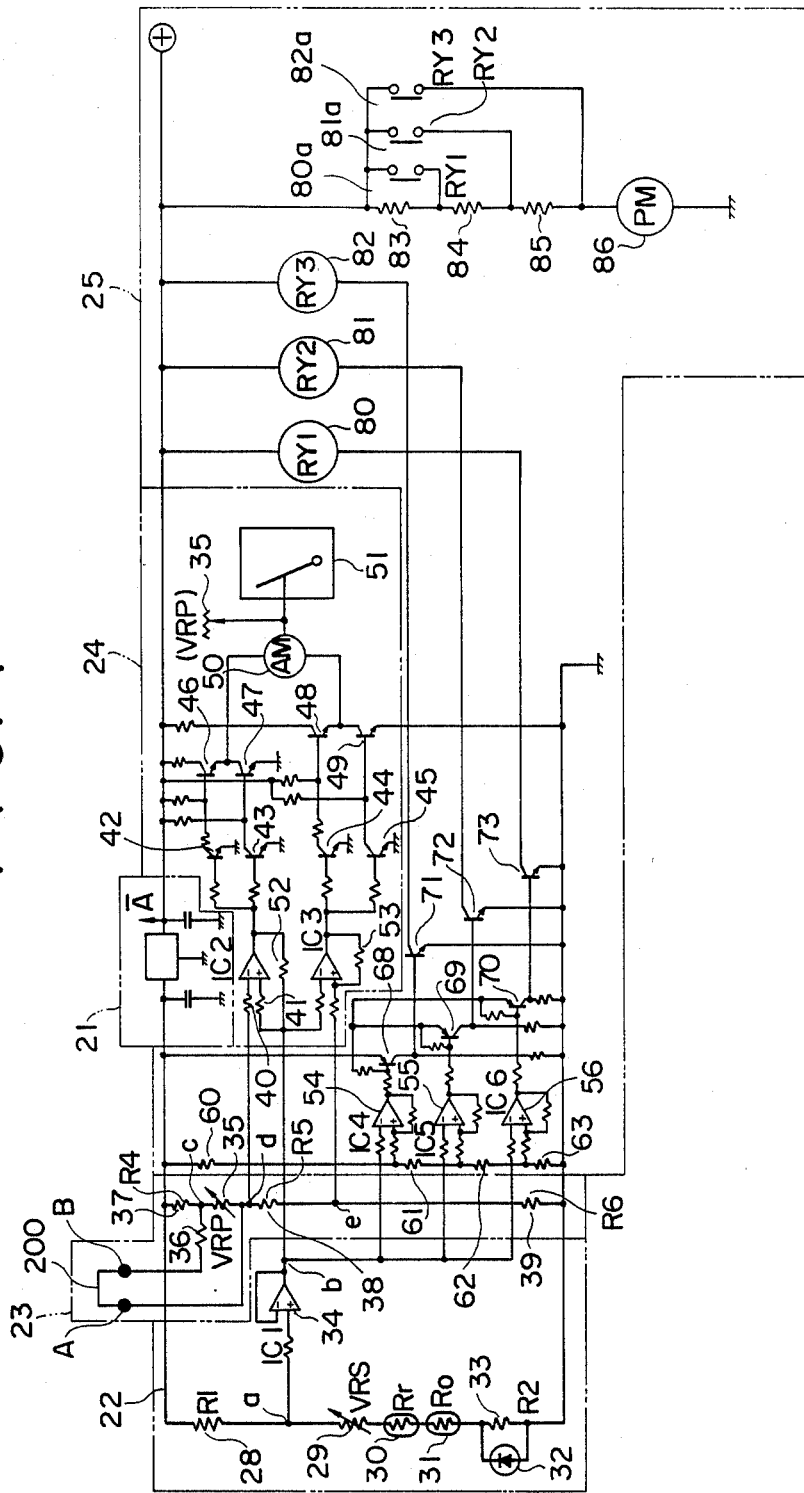
FIG. 7 shows an electrical circuit diagram of a controller according to a further embodiment of the present invention.

FIG. 7 shows only the automatic heater system of FIG. 6. In FIG. 7, an electrical short circuit 200 is connected between the points A and B.

FIG. 8 shows a functional characteristic diagram of the automatic heater system. The functions will be described with reference to FIG. 7. Since the short circuit 200 is connected between the points A and B, the opening of the air mix damper is forcedly controlled in the same manner as in the energy saving operation mode described with reference to FIGS. 3 to 5. There is shown the fan driving voltage possessing the same operational characteristic as in the example described with reference to FIGS. 3 to 5 in the heating region while since the fan control unit is contained in the air conditioning system but is not contained in the automatic heater system, the fan is always driven at the low speed (LOW). The operational characteristics of the fan driving voltage and the opening of the air mix damper are shown in FIGS. 8(A) and 8(B), respectively, and the temperature of the blow out air into the compartment is shown by a characteristic curve shown by a solid line of FIG. 8(C). The temperature of the heating region is controlled on the basis of the same characteristic as in the example described with reference to FIGS. 3 to 5 but the operation in the cooling region is not controlled.

Generally, since there is less condition in which the cooling region is not used in the north area, the automatic temperature control used only in the heating region greatly improves the system rather than the conventional manual operation of the air mix damper opening control and the fan driving voltage control. The automatic heater system of FIG. 7 which is the standard system for the vehicle can form the automatic air conditioning system as shown in FIG. 3 by removing the electrical short circuit 200 and adding the air conditioning system of FIG. 6 as an optional system.

Figure 8A:
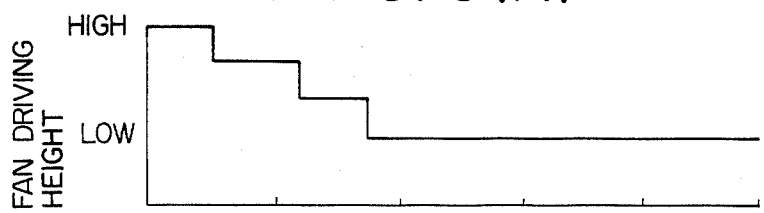
FIGS. 8(A) to 8(C) show a fan driving voltage characteristic, an air mix damper opening characteristic and a blow out air temperature characteristic with regard to command values in the controller of FIG. 7, respectively.
Figure 8B:
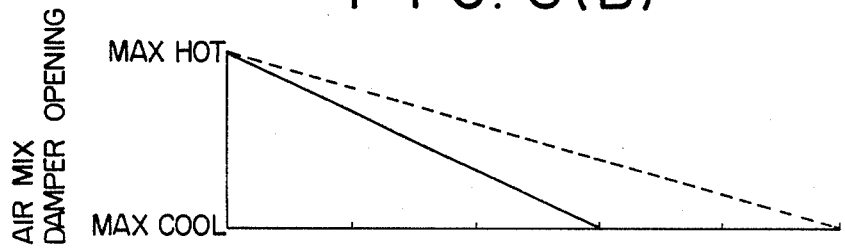
Figure 8C:
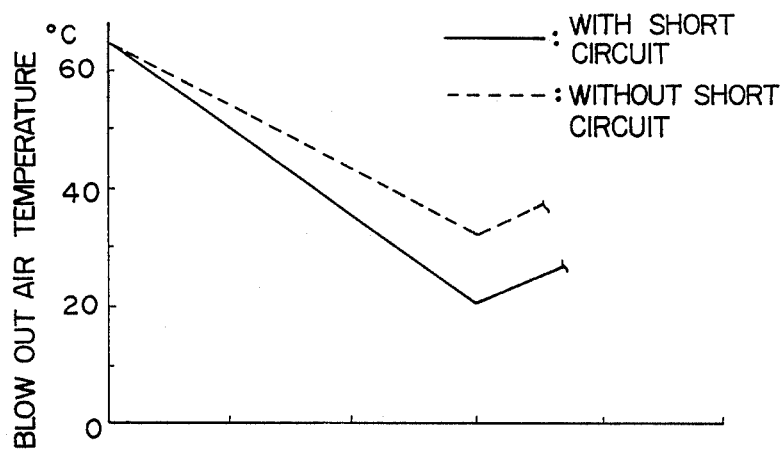
Figure 8D:
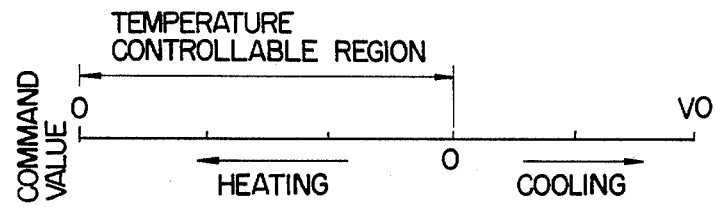
FIG. 8(D) shows the command values which are common variables of the characteristics of FIGS. 8(A) to 8(C).

The characteristics shown by dotted lines in FIGS. 8(B) and 8(C) are those in the case where the electrical short circuit is removed. Theoretically, in order to make equal the temperature in the compartment of the vehicle to the setting temperature in the heating region, it is necessary to attach the electrical short circuit possessing the characteristic shown by the solid line. However, the removal of the short circuit can attain the systems in which the temperature in the compartment is increased stably if desired.

What is claimed is:

1. In an air conditioner for a vehicle including a fan for sending air, a cooling unit having a compressor with a duty ratio of being turned on and off for cooling air sent by said fan, a heater for heating air sent by said fan, an air mix damper for adjusting the amount of air flowing through said heater, and an actuator for controlling an opening of said air mix damper in response to a cooling and heating load according to a command value having an amount in a cooling and heating range with an intermediate amount between the cooling and heating range, the improvement comprising:

a command value generating circuit (22) for generating a command value (b) which is dependent on a selected temperature selected for the vehicle (VRS);

a feedback circuit (23) for generating an amount of feedback (d) and (e) dependent on a position of the air mix damper (51) which is determined by said actuator (50), and dependent on the selection of an energy saving operation mode and a dehumidifying operation mode, said feedback circuit including a potentiometer (35) operatively connected to said damper (51) for changing its resistance dependent on the position of said damper, a fixed resistor (36) connected between said potentiometer and relay contacts (103a), said relay contacts connected to said fixed resistor for selectively connecting said fixed resistor in parallel with the resistance of said potentiometer;

an actuator control circuit (24) connected to said command value generating circuit and to said feedback circuit for receiving said command value and said feedback amount, said actuator control circuit being connected to said actuator (50) and including comparator means (40, 41) for comparing said command value with said feedback amount to control the operation of said actuator and thus control the position of said damper (51), said feedback amount and command value being selected so that said damper is opened during the energy saving operation mode and closed at the intermediate amount of the command value between the cooling and heating range thereof;

a fan control circuit (25) connected to said command value generating circuit for receiving said command value to control a speed of said fan (86);

a compressor control circuit (26) connected to said compressor for varying the duty ratio of turning said compressor on and off, said compressor control circuit being connected to said command value generating circuit for receiving said command value; and a dehumidification control circuit (27) having a dry relay (103) operatively connected to said relay contacts (103a) of said feedback circuit for selectively connecting in parallel said fixed resistor (36) with the resistance of said potentiometer (35), said fixed resistor being open circuited when the dehumidifying operation mode is selected and being included when the energy saving operation mode is selected, said dehumidification control circuit being connected to said compressor control circuit so that during the dehumidifying operation mode the air mix damper is adjusted to effect an air conditioning operation and during the energy saving operation mode the duty ratio of the compressor is changed to effect the air conditioning operation.

* * * * *